United States Patent [19]

Nilson et al.

[11] Patent Number: 5,448,123
[45] Date of Patent: Sep. 5, 1995

[54] ELECTRIC SYNCHRONOUS MOTOR

[75] Inventors: Thord A. G. Nilson, Langsjövägen; Gunnar C. Hansson, Karlavägen, both of Sweden

[73] Assignee: Atlas Copco Tools AB, Nacka, Sweden

[21] Appl. No.: 324,528

[22] Filed: Oct. 18, 1994

Related U.S. Application Data

[63] Continuation-in-part of Ser. No. 206,026, Mar. 2, 1994, abandoned, which is a continuation of Ser. No. 57,981, May 4, 1993, abandoned.

[30] Foreign Application Priority Data

May 5, 1992 [SE] Sweden ............... 9201406

[51] Int. Cl.⁶ ............................................. H02K 1/22
[52] U.S. Cl. ............................. 310/261; 310/42; 310/45; 310/156
[58] Field of Search ............... 310/261, 262, 264, 265, 310/156, 217, 45, 162, 163, 164, 165, 42, 216, 254, 44

[56] References Cited

U.S. PATENT DOCUMENTS

| | | | |
|---|---|---|---|
| 464,026 | 12/1891 | Kammeyer | 310/264 |
| 1,894,273 | 1/1933 | Hunziker | 310/261 UX |
| 2,877,366 | 3/1959 | Carr | 310/42 |
| 3,482,156 | 12/1969 | Porath . | |
| 3,659,129 | 4/1972 | Pettersen | 310/261 |
| 3,909,647 | 9/1975 | Peterson . | |
| 4,053,801 | 10/1977 | Ray | 310/261 |
| 4,858,304 | 8/1989 | Weldon | 310/42 |
| 5,091,668 | 2/1992 | Cuenot et al. . | |
| 5,099,160 | 3/1992 | Strozel . | |

FOREIGN PATENT DOCUMENTS

| | | |
|---|---|---|
| 509822 | 10/1930 | Germany . |
| 3716771C2 | 7/1989 | Germany . |
| 63-18950 | 1/1988 | Japan . |
| 881249 | 11/1961 | United Kingdom . |

*Primary Examiner*—R. Skudy
*Attorney, Agent, or Firm*—Frishauf, Holtz, Goodman, Langer & Chick

[57] ABSTRACT

An electric synchronous motor having a stator (10) with electric windings (14) and a rotor (16) which comprises a spindle (20) and a magnetic core (22), wherein the core (22) is formed by a number of annular magnetic discs (21) piled on the spindle (20) and having a length-to-diameter ratio exceeding 3. The discs (21) are insulated electrically from each other by layers of an inorganic material (17), such as an aluminum foil layer which is oxidized on both sides, and are axially clamped between shoulders (23, 24) on the spindle (20) to a high prestress level for obtaining a high bending strength, i.e. a higher coefficient of elasticity, of the rotor (16) as a whole.

10 Claims, 1 Drawing Sheet

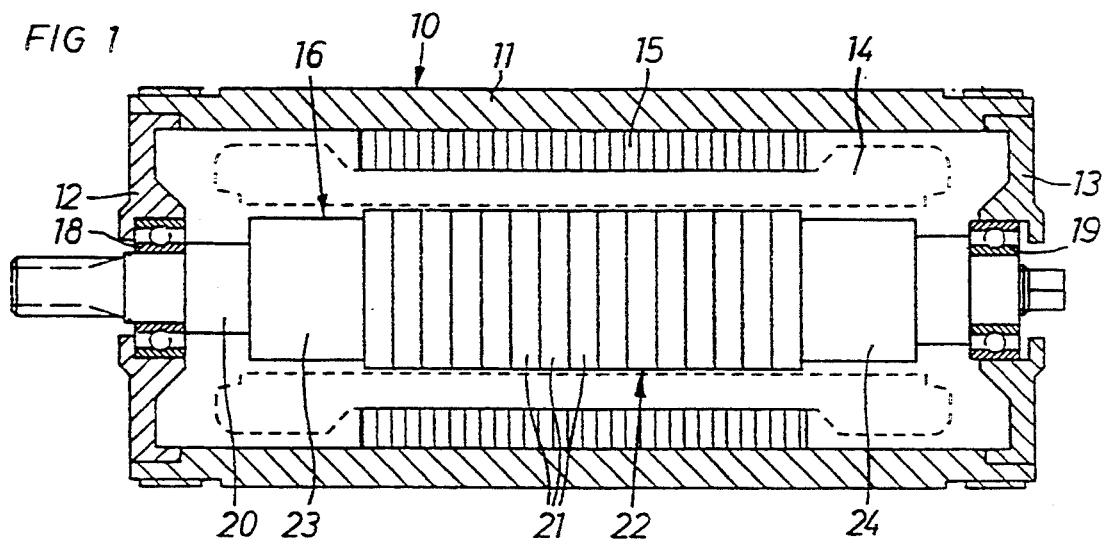
FIG 1
FIG 3
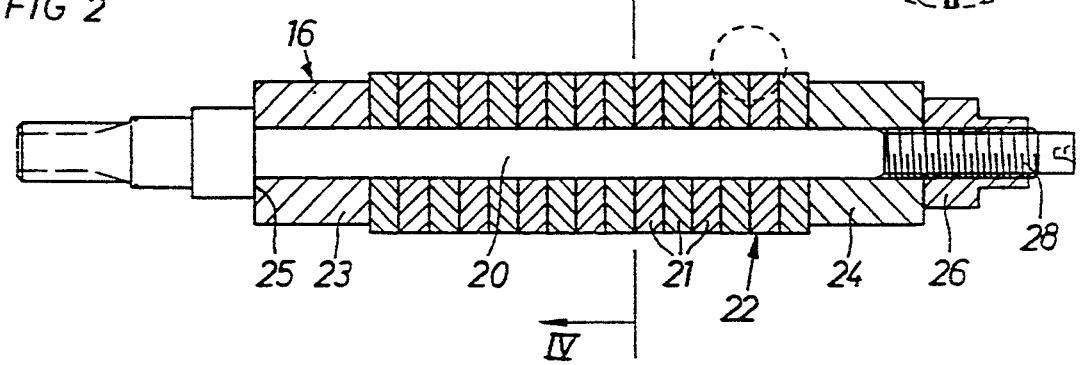
FIG 2
FIG 4
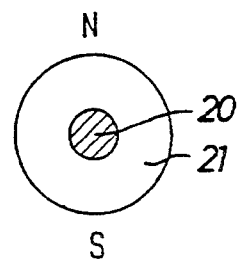

ELECTRIC SYNCHRONOUS MOTOR

This application is a continuation-in-part of application Ser. No. 08/206,026, filed Mar. 2, 1994, now abandoned, which is a continuation of Ser. No. 08/057,981, filed May 4, 1993 (now abandoned).

BACKGROUND OF THE INVENTION

This invention relates to an electric synchronous motor having a stator with electric windings and a rotor comprised by a spindle and a magnetic core. The core is formed by a number of annular magnetic discs piled on said spindle and separated electrically from each other by layers of insulating material.

It is previously known from U.S. Pat. Nos. 0,464,026 and 3,482,156 and from Japanese Patent Kokai No. 18950/88 (63-18950) to use a rotor with an axially laminated magnetic core consisting of a number of magnetic discs piled on a rotor spindle and kept together by an insulating resinous material.

This known technique, however, creates problems when designing motors for quick acceleration and retardation. To keep down the weight of the rotor, the rotation speed has to be increased, and to keep down the moment of inertia the diameter has to be small. Instead, the rotor has to be relatively long to keep up the performance of the motor. By using this previously known technique to form a magnetic rotor there will be a problem to obtain a good enough bending strength, a high flexing stiffness and a high critical rotation speed. Due to the fact that the magnetic discs according to the above mentioned patent are kept together by an adhesive which normally has a lower resistance to tension and splitting than to pressure strain, the bending strength of the rotor is reduced. This creates the risk that the weak rotor spindle will be subjected to all the strain.

The invention solves the above problems by using the rigidness and pressure load resistancy of the magnetic material of the discs. This is accomplished by prestressing the magnetic laminate to a stress level which is higher or equal to the occurring bending stresses caused by the load during operation. Hereby, the hollow cylinder formed by the laminate discs will act as if it were a solid body with the same stiffness and tension strength as for compressive load and bending.

Transferring torque from the active part of a long slim rotor to a small diameter spindle has also proved to be a serious problem for high performance motors in the past. Magnetic discs mounted with a pressfit or gluing work tend to loosen because of the twist deflection of the spindle in combination with temperature changes. Axial prestressing of the magnetic discs solves this problem as well.

The rotor design according to the invention is particularly suitable for so called slotless synchronous machines which permit high rotation speed but require a thick magnetic material in the direction of the magnetic flow to compensate for the wide magnetic air gap. A thick magnetic core, however, limits the spindle diameter.

BRIEF DESCRIPTION OF THE DRAWINGS

A preferred embodiment of the invention is described below with reference to the accompanying drawing, in which:

FIG. 1 shows a longitudinal section through an electric synchronous motor according to the invention.

FIG. 2 shows separately a longitudinal section through the rotor of the motor in FIG. 1.

FIG. 3 is a fractional view, on a larger scale, of the rotor.

FIG. 4 is a cross section of the rotor as indicated by IV—IV in FIG. 2.

DETAILED DESCRIPTION

The motor according to the invention comprises a stator 10 including a cylindrical casing 11, two end walls 12, 13, windings 14 and a tubular core 15 surrounding the windings 14, and a rotor 16. The rotor 16 is journalled in bearings 18, 19 in the stator end walls 12, 13 and comprises a central spindle 20, a number of magnetic discs 21 separated by layers 17 of insulating material. See FIG. 3. Each one of the insulating layers 17 comprise a thin washer of aluminum foil which is oxidized on both sides for obtaining electrical insulation. This material belongs to the category "inorganic materials" which have a coefficient of elasticity which is 50–200 times that of organic materials, such as different types of resinous materials, which have been previously used for magnetic disc insulation.

Moreover, inorganic materials such as oxidized aluminum foil have practically no tendency to yield or creep under heavy load, especially not under heavy load in combination with heat. Neither have these materials any tendency to adopt different coefficients of elasticity at different temperatures. Therefore, such an oxidized aluminum foil is particularly useful in the present invention.

These mechanical properties of the inorganic material used as an insulating material are crucial for obtaining and maintaining a high prestress level in the rotor core and, thereby, a high coefficient of elasticity in the rotor as a whole.

The discs 21 are all of the same thickness which is chosen so as to ensure eddy current losses of less than 40% of the losses caused by a one-piece magnet core. The desired thickness can be extracted from the equation:

$$F = C \frac{di^2}{dt} l_k^3 x$$

where F is the eddy current losses in the magnets.

C is a constant depending on geometry, winding and material properties.

$\frac{di}{dt}$ is the derivative of the current at switching, $l_k$ is the critical length of the eddy current path, i.e. disc thickness.

x is the number of discs covering the active rotor length.

The pile of prestressed discs 21 forms a hollow cylindrical core 22 which has a low number of poles, preferably two. See FIG. 4. For some applications two pairs of poles may be suitable. All discs 21 are arranged with the poles located in the same directions.

The discs 21 are axially clamped between two sleeve elements 23, 24 mounted on the spindle 20. One of the sleeve or shoulder elements 23 is axially supported by a shoulder or shoulder 25 on the spindle 20, whereas the other sleeve 24 is supported by a nut 26 engaging a thread 28 on the spindle 20. At the assembly of the rotor 16, the nut 26 is tightened up to the yield stress level of the spindle material so as to obtain the highest possible pretension of the magnetic core 22. This prestress level is high enough to assure that no local tensile stress due to bending loads will occur in the magnetic material or in the insulating layers 17. Both materials are brittle and have a low tensile strength.

By the axial clamping of the magnetic core 22 between the sleeve or shoulder elements 23, 24 and their support on the shoulder 25 and the nut 26, there is obtained an effective friction coupling between the spindle 20 and the magnetic core 22 for transferring torque therebetween.

By prestressing the magnetic disc core 22 as described above, the core 22 acts as a structural means to take up bending forces on the rotor 16. This means in turn that the proportion magnetic material to inactive pure structural material in the cross section of the rotor 16 inside the stator core 15 may be high, i.e. higher than 55% by volume, preferably 75%–85%.

As illustrated in FIGS. 1 and 2, the rotor 16 has a high length to diameter ratio, preferably exceeding 3, which means that it has a low moment of inertia to power output ratio. This makes the motor suitable for use in power tools, power wrenches in particular where a low moment of inertia is of importance to keep down the undesirable torque overshoot at tightening of so called stiff screw joints, i.e. screw joints with a steep torque growth to rotation characteristic.

We claim:

1. In an electric synchronous motor, comprising:
   a stator (10) having electric windings (14) thereon; and
   a rotor (16) including a spindle (20) and a magnetic core (22) including a plurality of annular magnetic discs (21) piled on said spindle (20), and said magnetic discs being separated electrically from each other by layers (17) of insulating material;
   the improvement wherein:
   said rotor (16) has a length to diameter ratio exceeding 3;
   said spindle (20) has spaced apart shoulders (23,24) thereon;
   said annular magnetic discs (21) are mounted on said spindle (20) between said shoulders (23,24), and said annular magnetic discs are axially prestressed toward each other by being clamped between said shoulders (23,24) on said spindle (20); and
   said insulating material of said layers (17) is an inorganic electrically insulating material for obtaining and maintaining a high coefficient of elasticity in said rotor (16).

2. The motor of claim 1, where said inorganic electrically insulating material comprises aluminum oxide.

3. The motor of claim 1, wherein a proportion of magnetic material to nonmagnetic material in a cross section of said rotor (16) exceeds 55%.

4. The motor of claim 2, wherein said inorganic electrically insulating material comprises washers of oxidized aluminum foil.

5. The motor of claim 2, wherein said aluminum oxide is in the form of an aluminum oxide foil member.

6. The motor of claim 1, wherein one of said shoulders (24) comprises a nut (26) engaging a thread on said spindle (20), wherein said axial prestress of said annular magnetic discs (27) is accomplished by tightening of said nut (26) on said thread.

7. The motor of claim 2, wherein one of said shoulders (24) comprises a nut (26) engaging a thread on said spindle (20), wherein said axial prestress of said annular magnetic discs (27) is accomplished by tightening of said nut (26) on said thread.

8. The motor of claim 3, wherein one of said shoulders (24) comprises a nut (26) engaging a thread on said spindle (20), wherein said axial prestress of said annular magnetic discs (27) is accomplished by tightening of said nut (26) on said thread.

9. The motor of claim 4, wherein one of said shoulders (24) comprises a nut (26) engaging a thread on said spindle (20), wherein said axial prestress of said annular magnetic discs (27) is accomplished by tightening of said nut (26) on said thread.

10. The motor of claim 5, wherein one of said shoulders (24) comprises a nut (26) engaging a thread on said spindle (20), wherein said axial prestress of said annular magnetic discs (27) is accomplished by tightening of said nut (26) on said thread.

* * * * *